C. B. CLARK.

BRUSH-HOLDER.

No. 6,731.

Reissued Nov. 9, 1875.

Witnesses.

Otto Hufeland.

Chas. Wahlers.

Inventor.

Charles B. Clark per

Van Santwood & Hauff attys

N. PETERS, PHOTO-LITHOGRAPHER, WASHINGTON, D. C.

UNITED STATES PATENT OFFICE.

CHARLES B. CLARK, OF BUFFALO, NEW YORK, ASSIGNOR TO CLARK & CO., OF SAME PLACE.

IMPROVEMENT IN BRUSH-HOLDERS.

Specification forming part of Letters Patent No. 80,453, dated July 28, 1868; reissue No. 6,731, dated November 9, 1875; application filed October 20, 1875.

*To all whom it may concern:*

Be it known that I, CHARLES B. CLARK, of Buffalo, in the county of Erie and State of New York, have invented a new and useful Improvement in Scrubbing-Brush Holders; which improvement is fully set forth in the following specification, reference being had to the accompanying drawing, in which—

Figure 1:
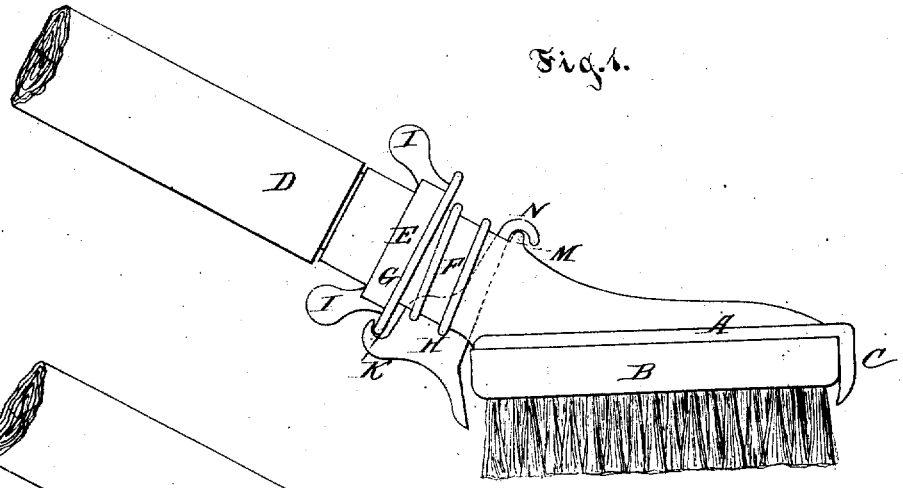
Figure 2:
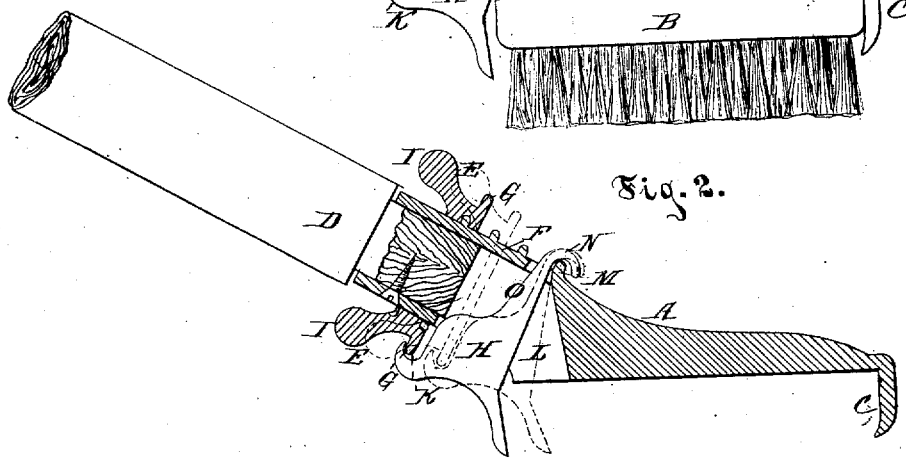
Figure 3:
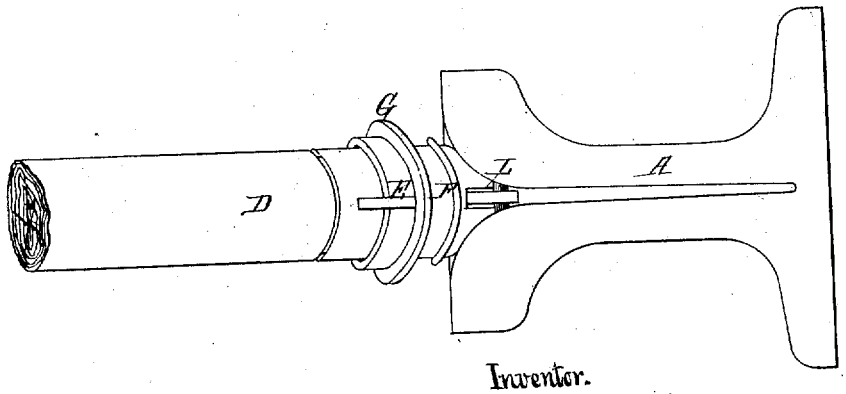

Figure 1 is a side elevation of the brush-holder. Fig. 2 is a vertical section, showing more fully the arrangement of the movable clamping-jaw and nut. Fig. 3 is a top view of the brush-holder.

Similar letters indicate corresponding parts.

My improvement relates to a clamping device provided with a handle, so that ordinary scrubbing-brushes can be held thereby, and can be operated by a person in a standing position.

The invention consists of a fixed jaw, the shank of which is mortised or slotted to receive the arm of a movable jaw, which swings in the slot, and is moved forward so as to clamp the brush between it and the fixed jaw, by means of a nut arranged upon the threaded shank of the fixed jaw. The shank is fitted to receive a suitable handle.

In the drawing, the letter A designates a frame or casting, with a fixed jaw, C, and a hollow inclined screw-shank, F, for inserting a wooden handle, D. The letter L designates a slot or mortise made in the screw-shank F of the fixed jaw, and H designates the movable clamping-jaw, which is placed in the slot, and secured in it in such a manner that it can swing therein toward and away from the clamping-surface of the fixed jaw, as is shown in Fig. 2. The movable jaw is secured in place in the slot L by means of a hook-joint connection, consisting of a lug, M, formed on the back of the frame A of the fixed jaw at the lower edge of the slot L, the lug being engaged by the hooked upper end N of the arm O of the movable jaw, which extends through the slot and engages the lug. The movable jaw is further secured from being displaced by the portion of the handle D which is driven into the hollow screw-shank F. Upon the screw-shank F is a thumb-nut, E, which impinges against the back of the movable jaw in such a manner that when the nut is screwed forward upon the shank, it pushes the movable jaw toward the fixed jaw, so as to clamp the brush B between the two jaws. When the brush is to be released, the nut is turned in a contrary direction, so as to release the movable jaw from pressure. I have provided, also, for drawing the movable jaw back along with the nut, by providing a flange, G, around the outside of the nut, which engages a slot or recess, K, in the movable jaw.

In operating my improvement, the brush is placed with its upper surface against the frame A, so that the jaw C will be in contact with one side of the brush-stock, when the movable jaw H is pressed against the other side of the brush-stock by rotating the thumb-nut E by its thumb-pieces I I, by which it is made to traverse the screw-shank F. The brush is readily released by turning the thumb-nut in the opposite direction.

By the peculiar construction of this brush-holder I am enabled to dispense with drilling holes, or using rivets, thereby greatly cheapening its manufacture. I also produce a very light article combining strength and durability, and efficiency and ease of operation.

What I claim as new, and desire to secure by Letters Patent, is—

1. The combination of the fixed jaw C, the movable jaw H, swinging in a mortise in the shank of the fixed jaw, and the nut E on the threaded shank of the fixed jaw, substantially as described.

2. The combination of a screw-shank, F, having a slot, L, with a stationary jaw, C, and a vibrating jaw, H, said jaw H having an arm arranged in said slot of the screw-shank, substantially as described.

3. The thumb-nut E and vibrating jaw H, having a slot, K, in combination with the flange G and stationary jaw C.

In testimony that I claim the foregoing I have hereunto set my hand and seal.

CHARLES B. CLARK. [L. S.]

Witnesses:

JOHN K. CLARK,

EDWIN L. FERGUSON.